United States Patent
Jacobs

(10) Patent No.: US 7,806,230 B2
(45) Date of Patent: Oct. 5, 2010

(54) ABSORPTIVE MUFFLER SUSPENSION

(75) Inventor: John J. Jacobs, Pulaski, NY (US)

(73) Assignee: Carrier Corporation, Farmington, CT (US)

( * ) Notice: Subject to any disclaimer, the term of this patent is extended or adjusted under 35 U.S.C. 154(b) by 147 days.

(21) Appl. No.: 11/995,934

(22) PCT Filed: Aug. 8, 2005

(86) PCT No.: PCT/US2005/028258

§ 371 (c)(1),
(2), (4) Date: Jan. 17, 2008

(87) PCT Pub. No.: WO2007/018543

PCT Pub. Date: Feb. 15, 2007

(65) Prior Publication Data

US 2008/0211152 A1    Sep. 4, 2008

(51) Int. Cl.
F01N 1/00 (2006.01)
F01N 1/08 (2006.01)
F01N 1/14 (2006.01)
F01N 1/24 (2006.01)
F04B 17/00 (2006.01)
F16F 1/36 (2006.01)
F16F 7/00 (2006.01)
F16L 3/00 (2006.01)
B60K 13/04 (2006.01)

(52) U.S. Cl. ........................ 181/247; 181/230; 181/257; 181/262; 181/283; 181/403; 180/89.2; 180/296; 248/60; 267/141; 267/153; 417/363; 417/902

(58) Field of Classification Search .................. 181/403, 181/230, 247, 257, 262, 283; 180/89.2, 296; 248/60; 267/141, 153; 417/363, 902
See application file for complete search history.

(56) References Cited

U.S. PATENT DOCUMENTS

| 2,110,395 | A | * | 3/1938  | Ash et al. .................. 181/247 |
| RE22,426  | E | * | 1/1944  | Smellie ...................... 15/326  |
| 2,483,007 | A | * | 9/1949  | Higham ...................... 417/419 |
| 3,204,723 | A | * | 9/1965  | Sunday ....................... 181/257 |
| 3,292,887 | A | * | 12/1966 | Cassel et al. .................. 248/60 |
| 3,352,573 | A | * | 11/1967 | Canning ........................ 285/2 |
| 3,526,293 | A | * | 9/1970  | Hayes et al. ................. 181/230 |
| 4,312,627 | A | * | 1/1982  | Jacobs et al. ................ 417/363 |
| 4,550,795 | A | * | 11/1985 | Teshima ..................... 180/296 |

(Continued)

OTHER PUBLICATIONS

International Preliminary Report on Patentability for International application No. PCT/US2005/028258 mailed February 21, 2008.

(Continued)

*Primary Examiner*—Jeffrey Donels
*Assistant Examiner*—Christina Russell
(74) *Attorney, Agent, or Firm*—Carlson, Gaskey & Olds PC

(57) ABSTRACT

A resilient mount useful in a muffler assembly includes a support arm, a bracket arm and at least one resilient portion. In one example, the resilient portion comprises neoprene to provide a cushion between the support arm and the bracket arm. The resilient mount is for supporting at least one absorptive body within a housing and isolating the housing from vibrations of the absorptive body.

11 Claims, 2 Drawing Sheets

U.S. PATENT DOCUMENTS

| | | | | | |
|---|---|---|---|---|---|
| 4,660,797 | A | * | 4/1987 | Tonnies | 248/610 |
| 6,095,460 | A | * | 8/2000 | Mercer et al. | 248/59 |
| 6,296,457 | B1 | * | 10/2001 | Shintoku et al. | 417/312 |
| 6,415,888 | B2 | | 7/2002 | An et al. | |

OTHER PUBLICATIONS

International Search Report and Written Opinion of the International Searching Authority for International application No. PCT/US05/28258 mailed Mar. 9, 2006.

* cited by examiner

ABSORPTIVE MUFFLER SUSPENSION

FIELD OF THE INVENTION

This invention generally relates to compressors. More particularly, this invention relates to absorptive mufflers for use in compressor systems.

BACKGROUND OF THE INVENTION

Absorptive mufflers are widely known and used within compressor-based chiller systems. A typical absorptive muffler includes an inner muffler body and an outer muffler body arranged as two concentric cylinders of absorptive material positioned within a housing situated on a discharge side of a compressor. The muffler is designed to dissipate high pressure pulsations in the discharge gas that exits the compressor. The discharge gas passes through an annulus between the two cylinders of the muffler arrangement to dissipate such high pressure pulsations.

One disadvantage with known absorptive mufflers is that the discharge gas may exit the compressor with relatively extreme pressure pulsations and at frequencies such that the muffler is unable to completely absorb the energy. As a result, the inner muffler body may vibrate. In a typical muffler, the inner muffler body is mechanically coupled to the housing and such vibrations cause increased noise.

There is a need for a muffler assembly that more effectively reduces vibration and noise transfer from the housing. This invention addresses that need.

SUMMARY OF THE INVENTION

An exemplary muffler assembly useful in a compressor assembly includes a first body and a second body generally surrounding the first body. A resilient mount having at least one resilient portion supports the first body and isolates the second body from vibrations of the first body.

In one example, the resilient mount comprises rigid arms with a resilient cushion between the arms. One example includes a plurality of such arms near each end of the first body.

The various features and advantages of this invention will become apparent to those skilled in the art from the following detailed description of the currently preferred embodiments. The drawings that accompany the detailed description can be briefly described as follows.

DETAILED DESCRIPTION OF THE PREFERRED EMBODIMENTS

Figure 1:
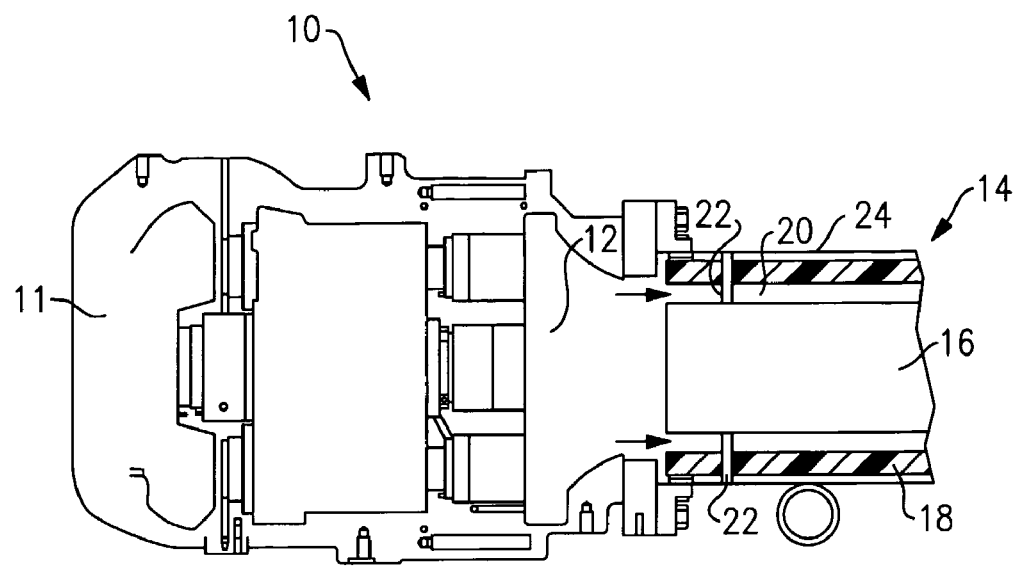
FIG. 1 schematically shows an example compressor assembly including a muffler assembly designed according to an embodiment of this invention.

FIG. 1 schematically shows an example compressor assembly 10 that compresses a fluid received within a suction inlet 11 and communicates the compressed fluid to a discharge housing 12. As the compressed fluid exits the discharge housing 12, it passes through a muffler assembly 14. In the illustrated example, the compressor assembly 10 comprises a screw compressor but this invention is not necessarily limited to a particular type of compressor.

In one example, the muffler assembly 14 includes a first body 16 and a second body 18. The first body 16 and the second body 18, for example, each comprise a known absorptive material as used in known compressor mufflers. In one example, the first body 16 and the second body 18 each are comprised of polypropylene surrounded by a perforated metal plate. The illustration shows the second body 18 generally surrounding the first body 16.

As the high pressure gas exits the discharge housing 12 and enters the muffler assembly 14, the fluid passes through a passage 20 between the first body 16 and the second body 18. Any high pressure pulsations of the discharge fluid are dissipated by the first body 16 and the second body 18.

The example muffler assembly 14 includes a resilient mount 22 for supporting the first body 16 relative to the second body 18 to establish the passage 20 between them. The resilient mount 22 at least partially isolates vibrations of the first body 16 caused by the high pressure pulsations of the discharge fluid from the second body 18 and an outer housing 24 of the muffler assembly 14. Resiliently mounting the first body 16 minimizes transferring vibration energy between the first body 16 and the second body 18 or the outer housing 24 and therefore reduces radiated sound. The second body 18 is supported relative to the housing 24 in a known manner.

Figure 2:
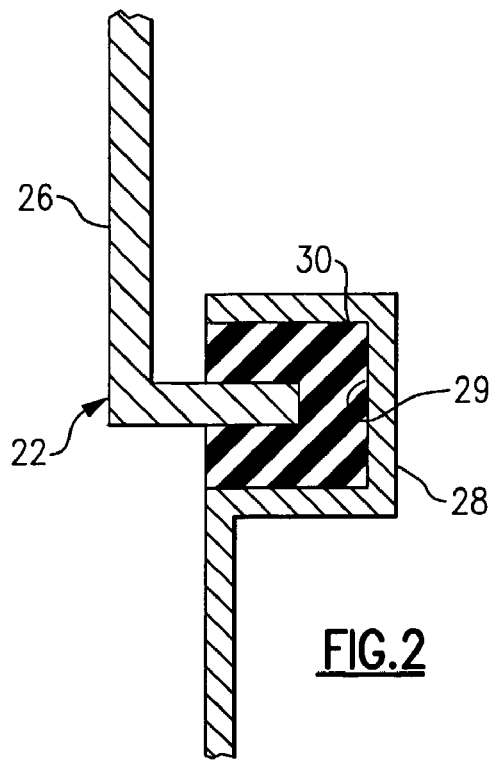
FIG. 2 schematically shows an enlarged view of an example resilient mount having a resilient portion.

FIG. 2 shows an enlarged view of an example resilient mount 22. The resilient mount 22 includes a rigid support arm 26, a rigid bracket arm 28 and a resilient portion 30. In one example, the support arm 26 is attached near one end to the first body 16 as known by welding or brazing, for example. An opposite end of the support arm 26 is received at least partially within a corresponding portion of the bracket arm 28. The bracket arm 28 is attached in a known manner to the outer housing 24 by welding or brazing for example. In one example, the support arm 26 and the bracket arm 28 comprise steel. In another example, the support arm 26 and the bracket arm 28 comprise aluminum. In another example, the support arm 26 and the bracket arm 28 comprise a thermoplastic material.

The example resilient portion 30 fits within a recess 29 on the bracket arm 28. The resilient portion 30 receives an end of the support arm 26 to provide cushion between the support arm 26 and the bracket arm 28. At the same time, the resilient portion 30 facilitates a reliable connection between the support arm 26, the resilient portion 30 and the bracket arm 28 such that the arms cooperate to adequately support the first body 16 within the housing 24.

In one example, the resilient portion 30 comprises neoprene. In another example, the resilient mount 22 comprises a coil spring. In another example, the resilient mount 22 comprises a leaf spring.

Figure 3:
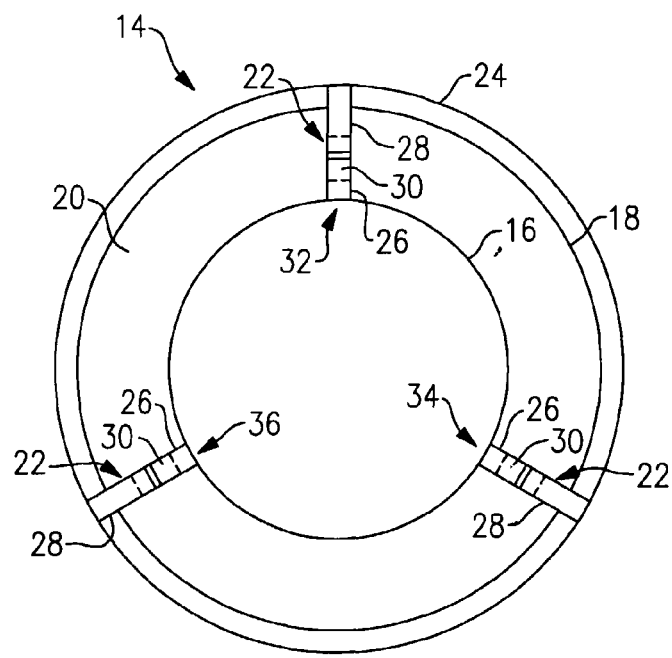
FIG. 3 schematically shows an end view of the exemplary muffler assembly.

FIG. 3 illustrates an end view of the first body 16 and the second body 18 of the example muffler assembly 14. In the illustrated example, the first body 16 and the second body 18 are concentric cylinders with the passage 20 extending in an axial direction (i.e., into the page) between the two cylinders. The resilient mount 22 in this example supports the first body 16 from at least three locations 32, 34 and 36, respectively. In one example, three cooperating sets of bracket arms 28 and support arms 26 extend radially between the first body 16 and the outer housing 24. In this example, the locations 32-36 are evenly spaced at 120° intervals. The first body 16 is completely supported by the resilient mount 22 such that vibrations of the first body 16 are isolated from the outer housing 24.

Figure 4:
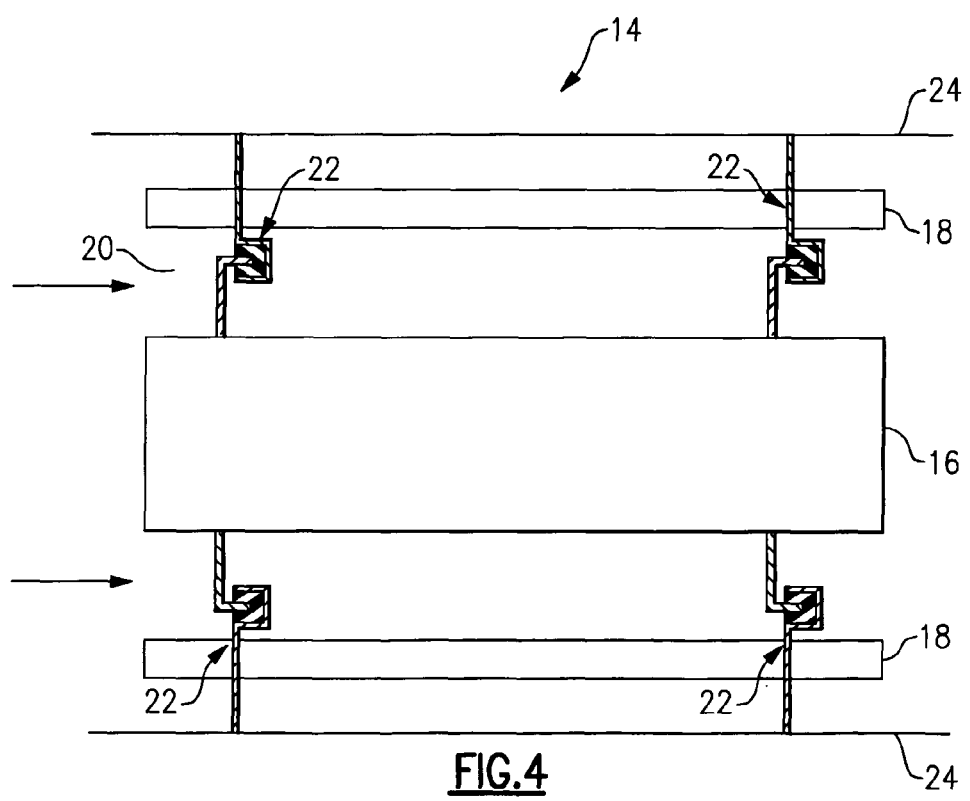
FIG. 4 schematically shows another feature of the example muffler assembly.

FIG. 4 shows another feature of an example muffler assembly 14. In this example, the muffler assembly 14 includes two resilient mounts 22 near opposite ends of the first body 16. The example resilient mounts 22 allow an adequate flow passage 20, reliably support the first body 16 and minimize any transfer of energy between the first body 16 and the outer housing 24 for isolating the latter from vibrations of the first body 16.

The disclosed examples provide improved sound performance in part, because they reduce vibration and radiated sound.

The preceding description is exemplary rather than limiting in nature. Variations and modification to the disclosed examples may become apparent to those skilled in the art that do not necessarily depart from the essence of this invention. The scope of legal protection given to this invention can only be determined by studying the following claims.

I claim:

1. An absorptive muffler assembly, comprising:
 a first body;
 a second body generally surrounding the first body;
 a resilient mount having at least one resilient portion and at least one support arm for supporting the first body and at least partially isolating the second body from vibrations of the first body; and
 a housing and a bracket arm attached to the housing, wherein the at least one support arm is attached to the first body and the at least one resilient portion is received within a recess of the bracket arm.

2. The assembly as recited in claim 1, wherein the first body and the second body comprise concentric cylinders.

3. The assembly as recited in claim 1, wherein the resilient mount comprises at least three support arms and three cooperating bracket arms extending radially between the first and second bodies.

4. The assembly as recited in claim 1, wherein the first body comprises an absorptive material.

5. The assembly as recited in claim 1, wherein the at least one resilient portion provides cushion between the at least one support arm and the bracket arm.

6. The assembly as recited in claim 1, wherein the second body comprises the housing and an absorptive material between the housing and the first body.

7. The assembly as recited in claim 1, comprising a second resilient mount, wherein the mounts are near opposite ends of the first body.

8. The assembly as recited in claim 1, wherein the resilient portion comprises neoprene.

9. The assembly as recited in claim 1, wherein the resilient mount comprises a spring.

10. The assembly as recited in claim 1, wherein the resilient mount reduces vibration and radiated sound in a compressor assembly.

11. The assembly as recited in claim 1, wherein the at least one resilient portion connects the at least one support aim to the bracket arm.

\* \* \* \* \*